(12) United States Patent
Wurn et al.

(10) Patent No.: US 6,515,472 B2
(45) Date of Patent: Feb. 4, 2003

(54) TRANSMISSION SELECTOR SENSOR ASSEMBLY PACKAGE FOR INTEGRATION INTO TRANSMISSION ASSEMBLY

(75) Inventors: Michael L. Wurn, Osceola, IN (US); Murray Kaijala, Elkhart, IN (US)

(73) Assignee: CTS Corporation, Elkhart, IN (US)

( * ) Notice: Subject to any disclaimer, the term of this patent is extended or adjusted under 35 U.S.C. 154(b) by 19 days.

(21) Appl. No.: 09/866,369

(22) Filed: May 25, 2001

(65) Prior Publication Data

US 2002/0175675 A1 Nov. 28, 2002

(51) Int. Cl.[7] .................................................. G01B 7/14
(52) U.S. Cl. ............................... 324/207.2; 324/207.22
(58) Field of Search ........................ 324/207.2, 207.12, 324/207.22, 207.25, 207.24; 330/32 R, 32 M; 123/617; 74/473.1, 335

(56) References Cited

U.S. PATENT DOCUMENTS

| | | | |
|---|---|---|---|
| 3,168,774 A | 2/1965 | Volkening | |
| 3,807,675 A | 4/1974 | Seckerson | |
| 4,027,794 A | 6/1977 | Olson | |
| 4,151,914 A | 5/1979 | Blatt | |
| 4,518,017 A | 5/1985 | Hennon | |
| 4,858,980 A | 8/1989 | Dreisig | |
| 4,907,769 A | 3/1990 | Hunley | |
| 4,938,440 A | 7/1990 | Weinfield | |
| 6,188,216 B1 * | 2/2001 | Fromer | 324/207.2 |
| 6,222,359 B1 | 4/2001 | Duesler | |
| 6,288,534 B1 * | 9/2001 | Starkweather et al. | 324/207.2 |
| 6,323,643 B1 * | 11/2001 | Kordecki | 324/207.2 |

* cited by examiner

*Primary Examiner*—Edward Lefkowitz
*Assistant Examiner*—Subhash Zaveri
(74) *Attorney, Agent, or Firm*—Mark W. Borgman; Mark P. Bourgeois

(57) ABSTRACT

A transmission selector position sensor is designed for easy integration into a transmission assembly. The transmission selector position sensor includes a Hall effect sensor carried on a stationary member to be mounted to the transmission body and a magnetic field generator to be mounted to a rotatable member mounted to the selector shaft. The sensor assembly is made so that the stationary member carries the rotating member prior to installation in the transmission, and then is not a load bearing member after installation.

14 Claims, 3 Drawing Sheets

TRANSMISSION SELECTOR SENSOR ASSEMBLY PACKAGE FOR INTEGRATION INTO TRANSMISSION ASSEMBLY

BACKGROUND OF THE INVENTION

Field of the Invention

This invention pertains to rotary or angular position sensors which are both durable and precise for application in rugged and demanding environments, particularly for application with internal combustion engines as transmission selector position sensors. This invention further pertains to sensors that are designed to be integrated into an overall assembly such as a transmission assembly.

SUMMARY OF THE INVENTION

Automobiles typically use a gear shift lever to enable the driver to change gears in the car. This shift lever is mechanically linked to a selector shaft in the transmission. In an automatic transmission, the driver can typically select between Park, Reverse, Neutral, Drive and Low gear. Increasingly, automobiles are being equipped with electronic controls to control various aspects of the engine. One such control can be used in the control of the transmission.

An electronic control unit for the transmission needs an electronic indication of the position of the gear shift lever. Past designs have utilized an electro-mechanical switch that provides an indication of the position of the gear selector shaft. While these switches provide a relatively simple solution they are not ideal. They are required to be positioned remote from the transmission and can include significant cost.

Various alternative mechanisms can be used to sense the selector shaft position. One approach is to use a Hall effect sensor. This type of sensor incorporates a magnet with a varying magnetic field. The Hall effect sensor provides an electrical output that is proportional to the strength of the magnetic field surrounding it. As the magnet is moved around the Hall effect sensor, the output varies to reflect the change in position. By attaching the magnet to the shaft, it is allowed to rotate as the selector position is changed. The Hall effect sensor then senses this movement and provides an electrical signal representation of the position of the selector shaft.

The magnet and the Hall effect sensor must be kept in proper alignment with each other. If the magnet is allowed to move or to be positioned incorrectly, the output from the sensor will not properly indicate the position of the selector shaft. This is easily accomplished when the sensor and the magnet are provided in a complete assembly. However, when separate pieces are provided to a transmission manufacturer, the possibility for improper assembly is introduced.

It is therefore an object of the present invention to provide a transmission selector shaft position sensor that can be incorporated into a transmission housing easily and reliably. It is a further object of the present invention to provide the separate components in a single assembly. It is a further object of the present invention to provide the components of a transmission selector shaft sensor that may be quickly located and assembled into a transmission housing.

Figure 1:
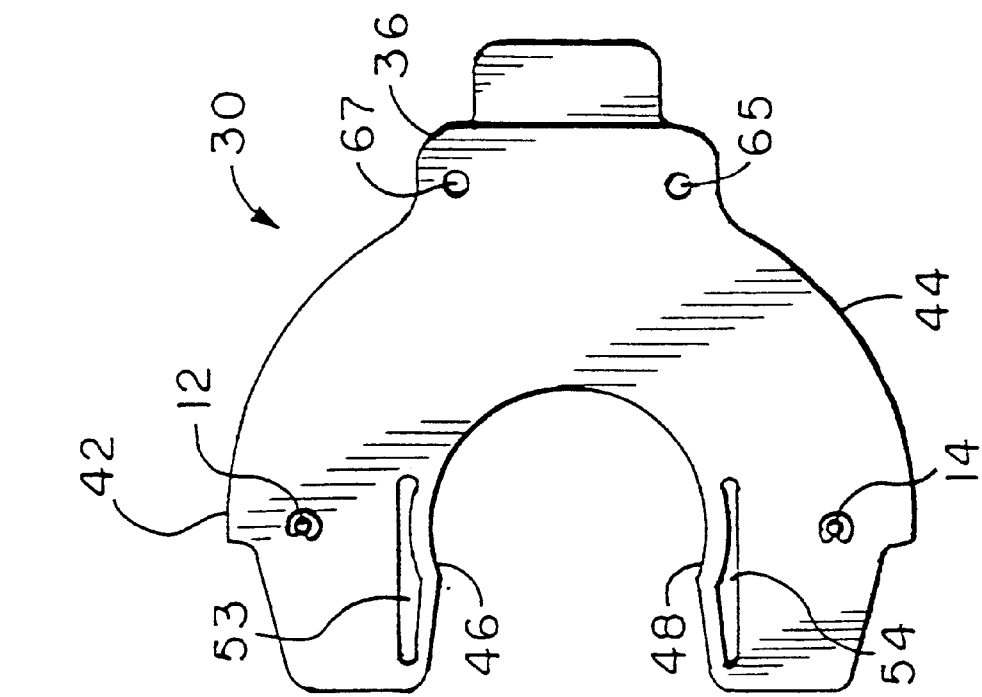
FIG. 1 is a top view of the preferred embodiment of a Rotary Position Sensor Using a Strain Gage prior to assembly.
Figure 1:
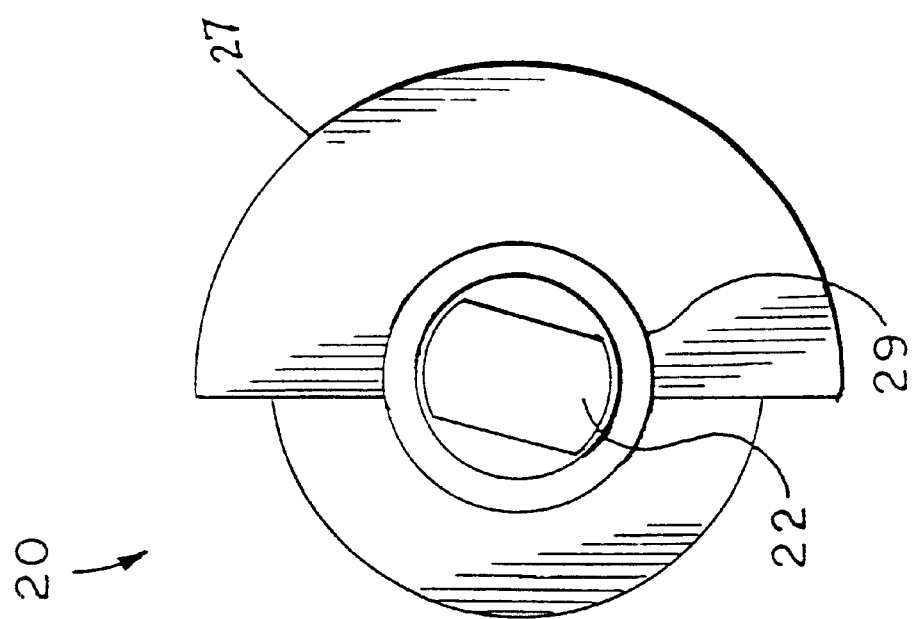
Figure 2:
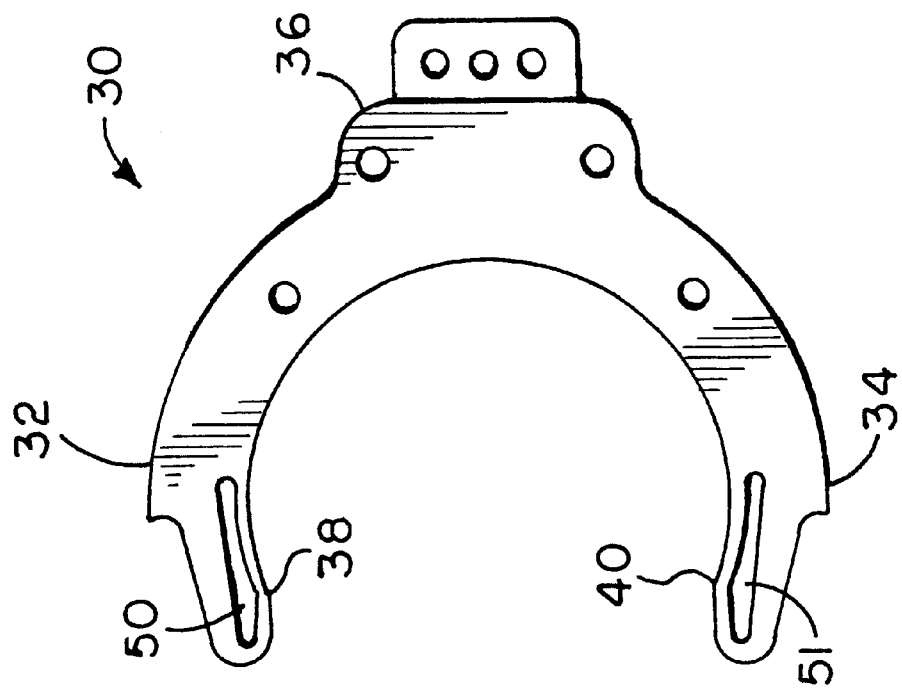
FIG. 2 is a bottom view of the preferred embodiment prior to assembly.
Figure 2:
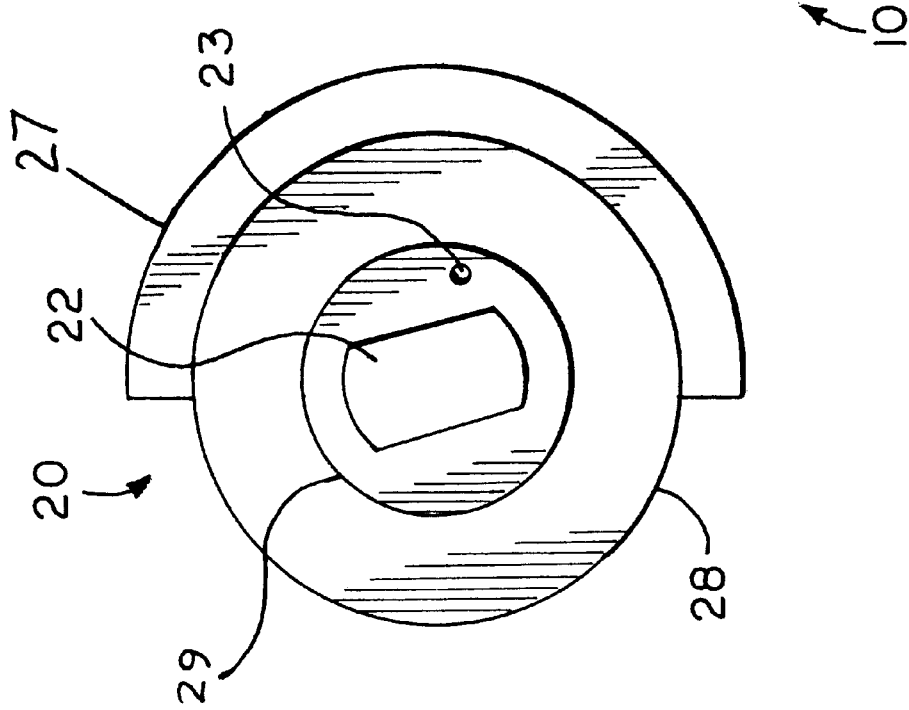

It is noted that the drawings of the invention are not to scale. The drawings are intended to depict only typical embodiments of the invention, and therefore should not be considered as limiting the scope of the invention. In the drawings, like numbering represents like elements between the drawings.

DETAILED DESCRIPTION OF THE PREFERRED EMBODIMENT(S)

Turning now to the preferred embodiment of the present invention, transmission selector shaft sensor 10 is comprised of a rotating member 20 and a stationary member 30. The rotating member 20 includes a selector shaft locator 22 running longitudinally therethrough. The selector shaft (not shown) is formed to mate with the selector shaft locator 22 so that the rotating member 20 will rotate with the transmission selector shaft. The selector shaft allows the driver of an automobile to select between Park, Reverse, Neutral, Drive and Low gear and the indicator is sometimes called a "PRNDL" switch.

The rotating member 20 is an injection molded piece and includes a pair of magnetic field generators 24,26. The magnetic field generators 24,26 are preferably magnets with tapered ends to provide a magnetic field that varies proportionally along the outer edge 27. A complete description of the preferred magnetic field generator 24,26 is included in U.S. Pat. No. 6,222,359 which is incorporated herein by reference.

The rotating member 20 includes a flange 28 along a top portion that extends above the upper magnetic field generator 24. The rotating member 20 further includes a shaft 29 running longitudinally along the rotating member 20. The shaft 29 is of a slightly smaller diameter than the flange 28.

Figure 3:
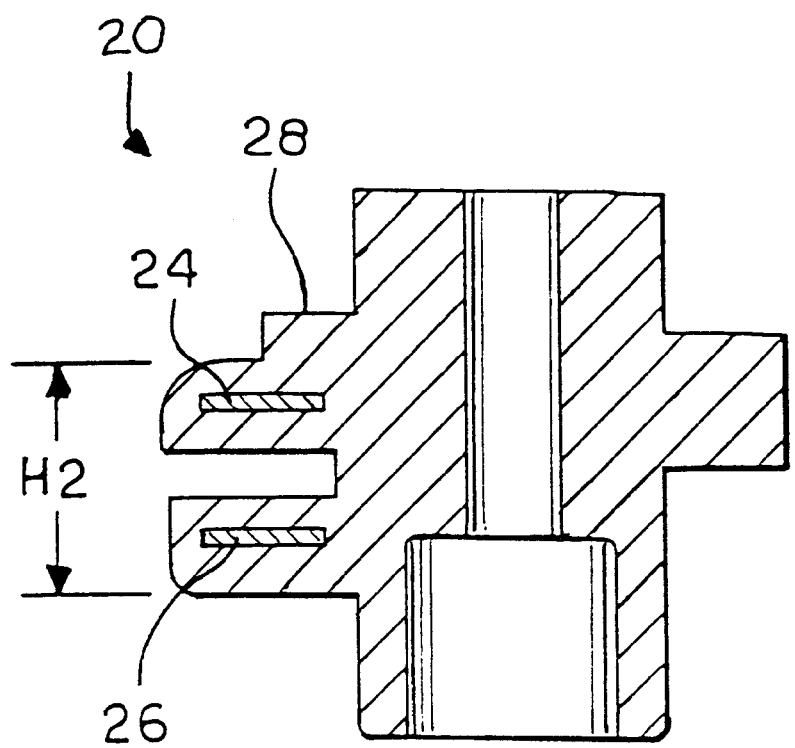
FIG. 3 is a cross-sectional side view of the rotating member
Figure 4:
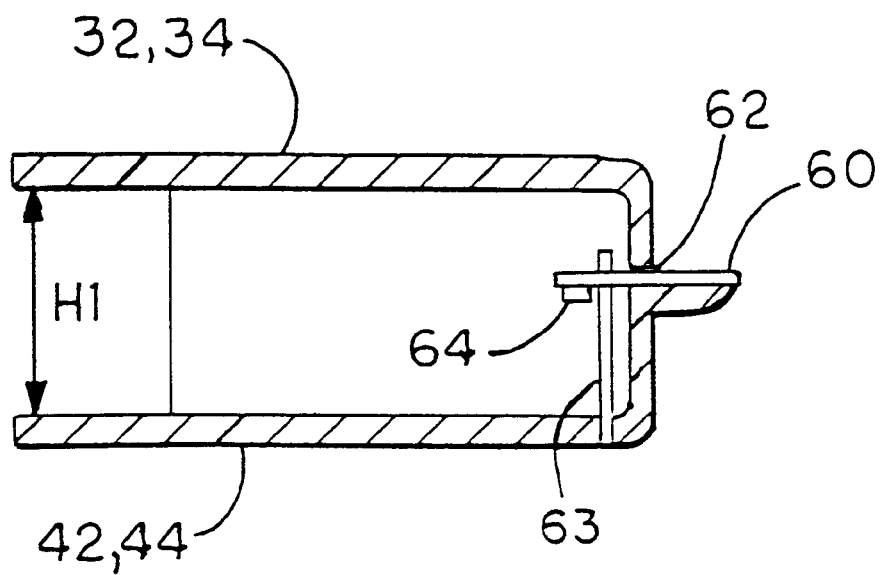
FIG. 4 is a cross-sectional side view of the preferred embodiment prior to assembly.

The rotating member 20 further includes an upper magnet 24 and a lower magnet 26. The magnets 24,26 are insert molded into the rotating member 20. The magnets 24,26 are generally arcuate and are parallel and spaced apart by an air gap. This is best shown in the side view of rotating member 20 in FIG. 3.

The stationary member 30 includes an upper first and second arm 32,34 extending out from the body 36. The upper arms 32,34 and body 36 together form an arc with a radius slightly larger than that of the flange 28 on the rotating member 20. The outer fingers 38,40 of the arms 32,34 project inward to define a slightly smaller radius than that of the flange 28 on the rotating member 20. The arms 32,34 include cutouts 50,51 behind fingers 38,40 to allow the molded material to easily flex for insertion and removal of rotating member 20. Thus, the rotating member 20 can be inserted through fingers 38,40 by causing a slight outward deflection in the fingers 38,40. After the rotating member 20 is inserted between the arms 32,34 of the stationary member 30, the rotating member is free to rotate but is captured loosely by the fingers 38,40.

Similarly, the bottom of the body 36 of the stationary member 30 has lower arms 42,44 which form an arc with a radius which is slightly larger than the radius of shaft 29 of the rotating member. The lower arms 42,44 include fingers 46,48 which project inward to define a slightly smaller radius than that of the shaft 29 of rotating member 20. The lower arms include cutouts 53,54 behind fingers 46,48 to allow the molded material to easily flex for insertion and removal of rotating member 20. Thus, while the rotating member 20 remains free to rotate, it is held loosely in place by fingers 46,48. The distance H1 between the first set of arms 32,34 and the second set of arms 42,44 is slightly greater than the distance H2 between the base of the flange 28 and the bottom of the lower magnet 26. This holds the rotating member 20 in place and prevents escape of the rotating member 20 from the stationary member 30.

The stationary member 30 further includes a printed circuit board 60. The body 36 includes a slot 62 which provides an interference fit into which the printed circuit board 60 is placed. The printed circuit board is then staked in place using pins 63 inserted into receiving holes 65,67 in the body 36. This locks the printed circuit board 60 in place and prevents movement within the body 36. The printed circuit board 60 is positioned so that it extends into the body 36 of the stationary member 30. In this way, when the rotating member 20 is placed into the body 36, the printed circuit board 60 is located between the magnets 24,26.

The printed circuit board 60 includes a semiconductor integrated circuit 64. The integrated circuit 64 carries a Hall effect sensor (not shown). The Hall effect sensor is essentially a semiconductor that is affected by a magnetic field. As the field around the sensor is increased, the output from the sensor increases. The output and the magnetic field have a linear relationship. As the selector shaft rotates, the rotating member 20 will rotate relative to the body 36. The magnets 24,26 are thus rotated relative to the printed circuit board 60 containing the Hall effect sensor. The variation in the magnetic field around the Hall effect sensor provides an output that represents the relative position of the selector shaft. The printed circuit board 60 could also include additional electrical circuitry including signal conditioning circuitry to provide a higher level signal output or analog to digital conversion circuitry to provide a digital output indicative of the position.

In some applications, redundancy is required to ensure an accurate signal. The present invention can be easily adapted to provide a dual or triplex redundant output signal. The printed circuit board 60 can include a second integrated circuit incorporating a second Hall effect sensor. This would allow a dual output from the sensor. It is also possible to provide two independent Hall effect sensors within a single integrated circuit. Use of this type of integrated circuit would also provide a dual output signal. A combination of these approaches can be used to provide triplex redundancy.

Transmission selector position sensor 10 is provided to a transmission assembly operation as an integrated assembly. However, the simple interference fit described herein that holds the rotating member 20 in place are insufficient to properly position and support the sensor in an automobile. The sensor 10 is provided with locating pins 12,14 on the body 36 of the stationary member 30. The rotating member 20 includes a key 23 which identifies the proper orientation for final assembly with the transmission. The selector shaft locator 22 guides the selector shaft into position in the rotating member 20. The locating pins 12,14 on the body 36 can then be placed into corresponding receiving locations on the transmission assembly (not shown). The selector shaft properly maintains the relative positioning of the components within the body 36 so that the arms 32,34,42,44 and fingers 38,40,46,48 do not make contact. Thus, in practice none of the surfaces of the body 36 are load-bearing members or interfere with the rotation of the rotating member 20.

After the transmission selector shaft sensor 10 is attached to the selector shaft and the transmission, the transmission assembly may be completed. This can include, for example, an electronic control unit mounted over the transmission selector shaft sensor.

While the invention has been taught with specific reference to these embodiments, someone skilled in the art will recognize that changes can be made in form and detail without departing from the spirit and the scope of the invention. For example, the described invention could similarly be used in any rotating sensor application. Examples of these sensors include throttle position sensors with the rotating member 20 mounted to the throttle shaft and the stationary member 30 is mounted to the throttle body. Similarly, the invention could be applied to an exhaust gas regulator sensor.

The described embodiments are to be considered in all respects only as illustrative and not restrictive. The scope of the invention is, therefore, indicated by the appended claims rather than by the description. All changes that come within the meaning and range of equivalency of the claims are to be embraced within their scope.

What is claimed is:

1. A sensor assembly comprising:
   a stationary member for mounting to a stationary component;
   a rotating member for mounting to a rotating component;
   the stationary member including a holding mechanism for retaining the rotating member in place; and
   wherein upon mounting the stationary member to the stationary component and the rotating member to the rotating component the stationary member ceases to hold the rotating member in its mounted position.

2. The sensor assembly of claim 1 and further comprising:
   a Hall effect sensor mounted to the stationary component; and
   a magnetic field generator carried by the rotating member; and
   wherein upon mounting the stationary member to the stationary component and the rotating member to the rotating component the Hall effect sensor is held in the magnetic field.

3. The sensor assembly of claim 2 and further comprising:
   the stationary component is a transmission body; and
   the rotating component is a transmission selector shaft; and
   upon assembly, the rotation of the transmission selector shaft rotates the magnetic field generator around the Hall effect sensor providing an electrical output indicative of the selector shaft position.

4. The sensor assembly of claim 3 and wherein the magnetic field generator is a magnet.

5. The sensor assembly of claim 1 and wherein the stationary member includes arms that have a slightly greater size than the rotating member and further includes fingers that have a slightly smaller size than the rotating member so that after the rotating member passes the fingers it is free to rotate within the stationary member arms, but the rotating member is held within the stationary member by the fingers.

6. The sensor assembly of claim 5 and wherein the fingers are indentations on the arms.

7. The sensor assembly of claim 5 and wherein the fingers are extensions of the arms.

8. A sensor assembly comprising:
   a stationary member including a Hall effect sensor;
   a rotating member including a magnetic field generator;

the rotating member being formed to receive a shaft;

the stationary member including a mounting mechanism for mounting to a stationary body;

the rotating member being free to rotate with the throttle shaft without interference from the stationary member upon assembly;

and wherein prior to mounting the stationary member to the transmission body and the rotating member to the shaft the rotating member is carried by the stationary member and after mounting the stationary member to the transmission body and the rotating member to the shaft the rotating member is carried by the shaft.

9. The sensor assembly of claim 8 and further comprising:

the rotating member including a guide for directing the throttle shaft into the rotating member.

10. The sensor assembly of claim 8 and further comprising:

the stationary member having locating pins for locating the stationary member on a transmission body prior to final assembly.

11. The sensor assembly of claim 8 and wherein the rotating body is formed from injection molded plastic.

12. The sensor assembly of claim 8 and further comprising:

a printed circuit board mounted to the stationary member;

the magnetic field generator further comprises a pair of spaced apart magnets; and wherein the printed circuit board extends between the spaced apart magnets upon assembly.

13. The sensor assembly of claim 12 and wherein the printed circuit board includes additional signal conditioning circuitry for providing an amplified output from the sensor.

14. The sensor assembly of claim 12 and wherein the printed circuit board includes additional electronic devices capable of providing an analog to digital conversion and providing a digital output from the sensor.

* * * * *